United States Patent [19]

Meenan et al.

[11] Patent Number: 4,778,606
[45] Date of Patent: * Oct. 18, 1988

[54] METHOD AND APPARATUS FOR SEPARATING POLYCHLORINATED BIPHENYLS FROM FLUIDIZABLE SOLIDS

[75] Inventors: William C. Meenan, Waukegan; George D. Sullivan, Wilmette, both of Ill.

[73] Assignee: American Toxic Disposal Partners, Waukegan, Ill.

[*] Notice: The portion of the term of this patent subsequent to Oct. 13, 2004 has been disclaimed.

[21] Appl. No.: 37,032

[22] Filed: Apr. 10, 1987

Related U.S. Application Data

[63] Continuation-in-part of Ser. No. 648,274, Sep. 5, 1984, Pat. No. 4,699,721, which is a continuation-in-part of Ser. No. 528,910, Sep. 2, 1983, Pat. No. 4,685,220.

[51] Int. Cl.$^4$ .............................................. F23G 7/00
[52] U.S. Cl. ...................................... 210/771; 34/27; 34/28; 110/238; 423/481

[58] Field of Search ............... 210/771, 806, 179, 180, 210/181, 188, 195.3, 220, 221.2, 909, 910; 34/27, 28; 134/37; 110/346, 235, 238; 423/481; 55/36, 38, 46, 43, 44

[56] References Cited

U.S. PATENT DOCUMENTS 4,140,066  2/1979  Rathjen et al. ................... 110/235
4,699,721  10/1987  Meenan et al. ................... 423/481

Primary Examiner—Frank Sever
Attorney, Agent, or Firm—Mason, Kolehmainen, Rathburn & Wyss

[57] ABSTRACT

A process and apparatus for treating any fluidizable solid material having a polychlorinated biphenyl contaminant absorbed or adsorbed thereon. The method and apparatus includes heating the fluidizable solids, using hot turbulent gas at a temperature in the range of 850° to 2,500° F. to vaporize and thereby separate the polychlorinated biphenyls from the fluidizable solids and to fluidize at least a portion of the solids. The polychlorinated biphenyl vapors are then further treated to dispose of the polychlorinated biphenyls, such as by condensing the liquid and filtering or decanting them from the condensed water.

29 Claims, 2 Drawing Sheets

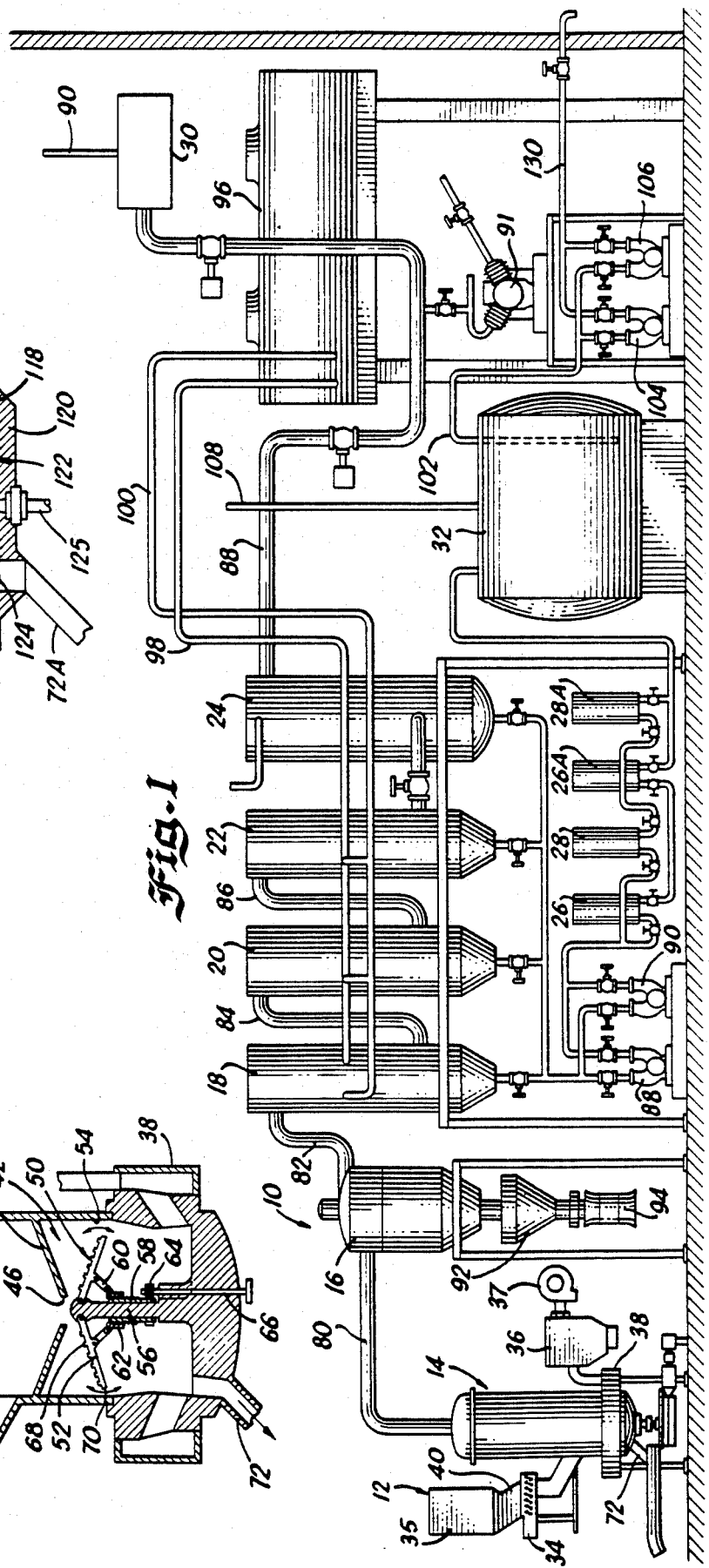
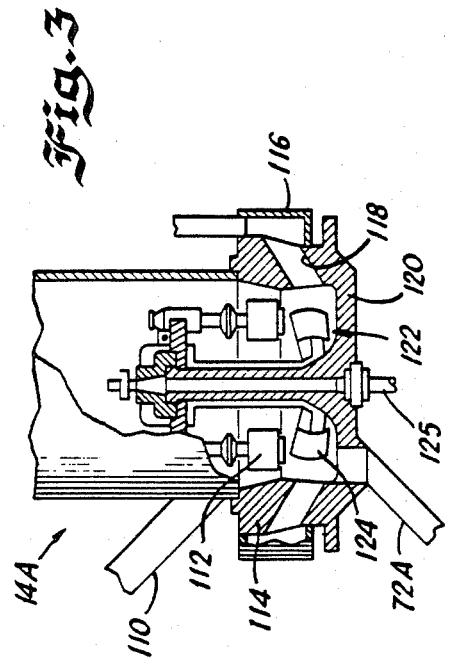
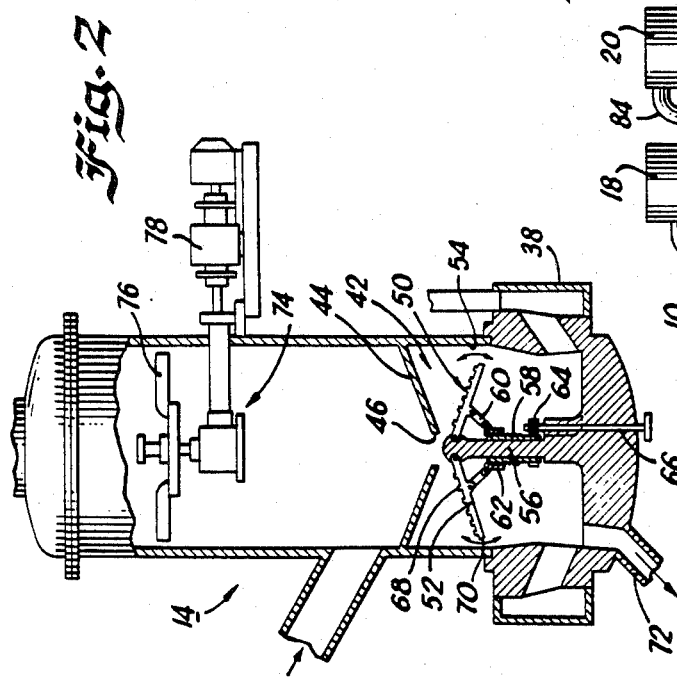

METHOD AND APPARATUS FOR SEPARATING POLYCHLORINATED BIPHENYLS FROM FLUIDIZABLE SOLIDS

This is a continuation-in-part of Ser. No. 06/648,274, filed 09/05/84 now U.S. Pat. No. 4,699,721, which is a continuation-in-part of Ser. No. 06/528,910, filed 09/02/83, now U.S. Pat. No. 4,685,220.

BACKGROUND OF THE INVENTION

1. Field of the Invention

This invention relates generally to methods and apparatus for treating a fluidizable solid, such as natural and artificial sludges, having a an organic liquid absorbed or adsorbed thereon, the separate the organic liquid from the fluidizable solid for recovery or disposal of the organic liquid, leaving a relatively uncontaminated solid material. More particularly, the present invention is directed to processes and apparatus for separation of toxic chemicals e.g. polychlorinated biphenyls and other polyhalogenated organic toxic chemicals from a fluidizable solid material so that the fluidizable solids can be returned to this source or otherwise used as non-hazardous materials. The separated toxic chemicals, in relatively concentrated form, are easily disposed of, such as by burial or incineration.

2. Background and Prior Art

Polychlorinated biphenyls, or PCBs, were manufactured from 1929 to 1978. The manufacture of polychlorinated biphenyls has been banned in the United States since 1978. These chemicals have been widely used in capacitors, transformers, carbonless carbon paper, hydraulic pumps, vacuum pumps, heat transfer fluids, plasticizers, lubricants, caulking compounds, inks, paints and insect sprays. The major application of PCBs has been in large electrical capacitors and transformers. It has been estimated that over 800 million pounds of PCBs have been produced. A tremendous amount of these chemicals, suspected of causing cancer and birth defects, have been dumped over a number of years, either accidentally or deliberately, in an entirely reckless fashion. Commonly, these chemicals were dumped in lakes, streams and waterways where they eventually collected in the bottom material in considerable concentrations.

The accumulation of PCBs in human and animal tissue and their toxic effects have been well documented. Further, PCBs are a significant hazard to the environment and their disposal has caused great concern. Incineration and land burial have been the main methods of PCB disposal. However, while incineration has been demonstrated effective for liquid contaminated PCBs, incineration of solid wastes containing PCBs has not ben demonstrated (Federal Register, Vol. 41, No. 64, Apr. 1, 1976). Accordingly, solids containing PCBs, such as waterway sludge, had to be buried in a chemical waste landfill. The great volume of sludge for transportation and burial represents a tremendous cost for such PCB disposal.

Because of the method of dumping toxic chemicals such as PCBs, dioxin, pesticides such as DDT, herbicides, insecticides, and other organic toxic chemicals, a tremendous mass of soil has been contaminated. In the past, bottom soils or the like contaminated with these toxic organic fluids have been treated by attempting to burn or by burying them. Because of the nature of the materials in which the PCB contamination is often found, burning is extremely difficult and burying is often only a stop gap measure. Many microorganisms have been reported that can degrade PCBs to some degree. The limited information presently available indicates that PCBs have a strong affinity for soil. Other organic liquids and toxic chemicals have been extremely difficult to separate from solid materials when adsorbed and/or absorbed thereon.

It has been recognized that thermal decomposition of polychlorinated organic compounds is possible despite the very high degree of thermal stability of these compounds. U.S. Pat. No. 4,140,066 discloses a method of decomposing PCBs by exposure to heat in a combustion chamber which operates with extremely intense turbulence and pulsation under temperatures as low as 850° C. and with residence times as short as 0.1 second. However, the patent provides no method or apparatus for dealing with the problem of the treatment of mountainous amounts of contaminated, wet material having a relatively low heating value. Thus, while the method set forth in the '066 patent may be highly useful in eliminating PCB containing compounds in relatively small volumes, the process is not particularly helpful in dealing with contaminations on the order of tons in the form of residues in solids such as sludge.

A variety of techniques for incinerating waste material are known. The following U.S. Pat. Nos. are exemplary: 4,245,570; 3,858,534; 3,829,558; 3,812,794; 3,716,339; and 3,511,194. A device such as the Williams U.S. Pat. No. 4,245,570 has been found to be effective in drying sewage sludge, but, prior to the present invention, has not been used to remove toxic chemicals from a fluidizable solid material, such as a sludge e.g., sand, clay, diatomaceous earth, charcoals, carbon, coals, silicas, alumina, silica-aluminas, metal particulates, metallic ores, and artificial sludges, such as those resulting from industrial spill absorption of liquids into an absorbent material.

SUMMARY OF THE INVENTION

In brief, the present invention is directed to a method and apparatus for separating organic compounds having a boiling point, corrected to 760 millimeters mercury, of at least 110° C. and generally in the range of 110° C. to 650 ° C., from a fluidizable solid material. The most significant embodiment is directed to separation of toxic organic chemicals, and particularly polychlorinated biphenyls, from soil, such as sludge. The fluidizable solids usually contaminated with one or more organic liquids, such as PCBs, are generally in the form of a wet sludge, usually containing more than about 10% liquid, although the process and apparatus described herein are also useful in removing organic compounds from a relatively dry fluidizable solid material (i.e. 0–10% water) soil. The contaminated fluidizable solid material is directed into a separator vessel where the contaminated solids are contacted with a hot gas to dry the solids and vaporize the organic contaminant. Quite surprisingly, it has been found that when the sludge is contacted with hot gas having a temperature in the range of about 850° F. to about 2500° F., practically all of the organic contaminants contained in or on the fluidizable solids are vaporized and are easily removed from the separator vessel, together with the vaporized water, for separation and subsequent contaminant disposal or recovery.

It has been found that a sludge contaminated with an average of about 140 parts per million polychlorinated biphenyls or other toxic chemicals, such as DDT, can be dried and PCBs removed by contact with hot gas at about 850° to about 2500° F. in a single pass through the separator vessel, leaving less than 1 part per million of PCB in the dried soil. This result is most surprising to those skilled in the art particularly since the temperature in the separator vessel above a sludge-combustion gas contact zone is only about 300° F. to 400° F. in a secondary fluidized bed region and the boiling point of the polychlorinated biphenyls is above 550° F. One would assume that a substantial portion of the vaporized PCBs would condense in the lower temperature secondary fluidized bed region above the sludge-hot gas contact zone leaving a substantial portion of the PCBs in the dried sludge.

Further, it has been found that this same surprising separation is useful for separating from a fluidizable solid material, any organic compound having a true boiling point, corrected to 760 mm. mercury, of at least 200° C.

This surprising recovery is achieved from fluidizable solid materials contaminated with any substituted hydrocarbonaceous compounds having a true boiling point, corrected to 760 mm. mercury, in the range of 110° to 650° C., and is particularly surprising for the substituted compounds containing at least one unsaturated ring and at least one halogen atom, such as polychlorinated biphenyl; TDE-tetrachlorodiphenyl dichloro ethane; DDT - dichlorodiphenyl trichloroethane; chlorobenzenes - particularly tri; lindane; various hexachlorocyclohexanes; DMSO - dimethylsulfoxide; sulfolane and derivates; dioxin and derivates, e.g. tetrachlorodibenzo-p-dioxin; dieldrin; chlordane; aldrin; dibenzo furan and halogenated derivates; miscellaneous compounds and contaminants; by-products etc., associated with the production and use of: phenols/mercaptans/organic sulfides; biocides/algicides/herbicides; maleic and phthalic anydrides and by-products; aniline and derivatives; resorcinol; detergents (non-metallic); sludges resulting from clean-up of oil and chemical spills; filter cakes; and for the treatment of sludges prior to soil-farming for heavy hydrocarbon residue disposal.

After separation from the fluidizable solid material, the vaporized contaminant can be easily recovered in relatively concentrated form for efficient disposal or reuse. The particular method of recovery, for example may comprise, adsorption and desorption, condensation and separation from water as by density separation or fractionation, filtration and the like. Much will depend upon the density of the contaminant compared to water and miscibility of the contaminant in water. The particular recovery method for each given contaminant can be accomplished by one skilled in the art once the contaminant is separated from the fluidizable solid material.

The gas leaving the separator includes water vapor, combustion gases, contaminant liquid, in vapor form, such as a toxic chemical, and a minor amount of entrained, relatively fine particulate solid material. The gas from the separator can be further treated in a number of alternative ways to remove the contaminant for reuse or disposal. For example, the entrained solids can be removed in a cyclone or filter and the remaining gas condensed to provide a polyhalogenated organic (i.e. PCB)-water liquid composition. The condensed PCB-water composition can be conveyed to a relatively placid holding tank for removal of essentially uncontaminated water from an upper water level, since the PCBs are essentially insoluble in water (on the order of about 50 parts per billion) and substantially heavier than water.

Accordingly, an object of the present invention to provide an apparatus capable of separating organic contaminants from fluidizable solid materials, particularly organic toxic contaminants containing at least one unsaturated ring such as PCBs, dioxin and chlordane.

It is also an object of the present invention to provide a method and apparatus for treating contaminated river, lake, and waterway bottom material to separate toxic chemicals therefrom.

Still another object of the present invention is to provide a method and apparatus for vaporizing organic liquid materials, having a boiling point of about 110° to about 650° C., from a fluidizable solid material such as sludge so that the liquids can be further treated for recovery or disposal and the sludge safely returned to its original location or otherwise safely used, for example, as landfill material.

A further object of the present invention is to provide a method and apparatus for separating toxic chemicals and other organic contaminants, for example, polyhalogenated organic chemicals, such as PCBs and chlordane, from a fluidizable solid material by fluidizing the solid material by contact with a hot gas at about 850-2500° F. in a fluidized hot gas-solid contact zone; passing the vaporized contaminants through a secondary fluidized bed zone within the separator at a temperature of about 200° F. to about 575° F.; removing the vaporized contaminants from the separator; and condensing the toxic chemicals for convenient disposal or re-use in liquid form.

These and many other objects and advantages of the present invention are achieved by a method and apparatus for treating contaminated fluidizable solid materials, such as sludge, that includes the steps of heating the sludge by exposure to hot gas at a temperature of 850° to 2,500° F., thereby driving the water and contaminants from the sludge and leaving a dry particulate mass of solids. The contaminant materials are formed into a gas stream and further treated, such as by filtration or by condensing the contaminants and separating them from the water.

In accordance with another embodiment of the present invention apparatus for treating contaminated fluidizable solid materials includes a mixing means for mixing the solids to be treated. A drying means separates the contaminant liquids, such as toxic chemicals, and water from the solids and includes means for exposing the fluidizable solids to a hot gas stream to fluidize a portion of the solids for efficient, new and unexpected vaporization and separation of the contaminant. Other apparatus may be provided to remove the fine particles from the gas stream and separate the contaminants from water.

BRIEF DESCRIPTION OF THE DRAWINGS

FIG. 1 is a schematic, elevational view of the apparatus in accordance with one embodiment of the present invention; and FIG. 2 is an enlarged view of the toxic chemical separator or vaporizer portion of the apparatus of FIG. 1;

FIG. 3 is an enlarged view of another embodiment of the toxic chemical separator or vaporizer portion of the apparatus of FIG. 1;

DETAILED DESCRIPTION OF THE PREFERRED EMBODIMENT

Figure 4:
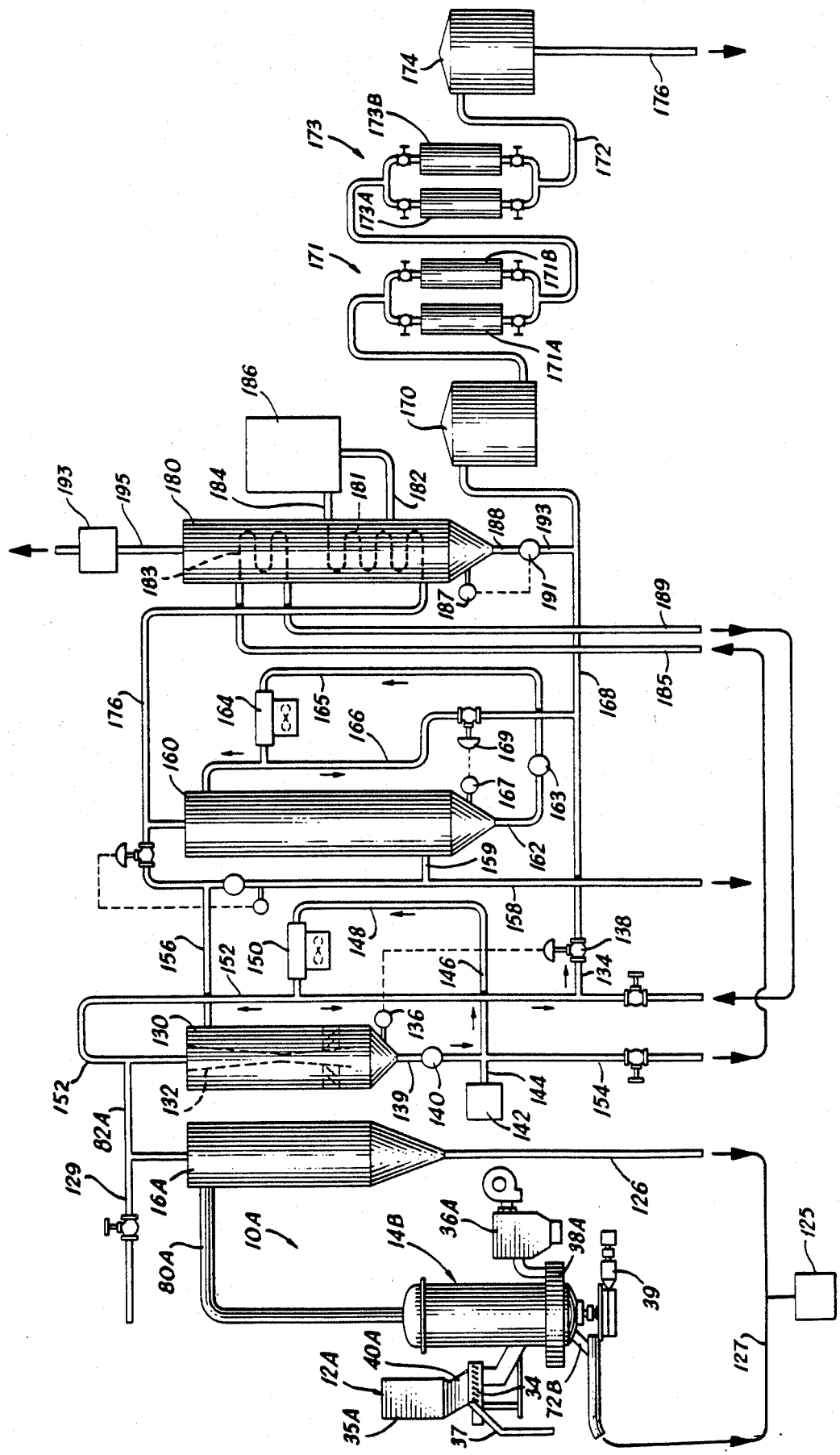
FIG. 4 is a schematic, elevational view of the apparatus in accordance with another embodiment of the present invention.

Referring to the drawings wherein like reference characters are used for like parts throughout the several views, a contaminated fluidizable solid treating apparatus 10, shown in FIG. 1, includes a mixer 12; a separator 14; a cyclone separator 16; a plurality of vapor condensing stages 18, 20 and 22; a non-condensed gas holding or storage vessel 24; two liquid filter sections 26 and 28; an activated carbon gas filter 30; and an aqueous waste storage vessel 32. Wet or dry fluidizable solids contaminated with PCBs or a organic compound, particularly a compound having at least one unsaturated ring and at least one halogen atom, for example, PCBs and other similar toxic chemicals such as DDT and chlordane is poured into the apparatus 10 through the mixer 12. The nature of the fluidizable solids is not critical, and the device is adapted to operate with soil, sand, mud, sewage, organic matter, clay, diatomaceous earth, charcoals, carbons, coals, silicas, aluminas, silica aluminas, metal particulates, metallic ores, artificial sludges such as those formed by absorption of chemicals onto an absorbant, effluvia and the like, conveniently in the form of waterway bottom dredgings.

The mixer 12 is conveniently a conventional mixer/feeder with a screw or auger feeding mechanism 34 (i.e. FIG. 3) arranged generally horizontally within the mixer 12. As the sludge is poured into the mixer 12, it is thoroughly mixed and forwarded into the toxic chemical separator 14. The sludge, for example as extracted from a body of water, is deposited into the mixer 12 having a hopper 35 of suitable size to hold a relatively large quantity of sludge above the feeding mechanism. If desired, for safety purposes, the hopper 35 can be a welded and pressure tested steel container with a gasketed top. When filled, the hopper 35 can be closed and sealed. The discharge from the mixer 12 can be controlled by a standard flow control device (not shown) to vary fluidizable solids flow into the separator 14 to correspond to separator operating capacity. The connection between the hopper 35 and the auger 34 section is flanged with a suitable gasket to eliminate the possibility of spillage.

The auger portion 34 of the mixer 12 transfers the fluidizable solids, generally in sludge form (for example, 5 to 90 percent water, and generally 30 to 70 percent water) from the hopper 35 to the separator 14. The auger section 34 has an electrically driven rotating variable speed screw or auger to supply the separator 14 with a continuous feed at approximately 1,000 pounds per hour of sludge. As shown in FIG. 2, the sludge may be poured in a wet state (including for example 20%-90% solids) into the separator 14 and quickly dried. Very hot air and combustion gases generated in burner or furnace 36 are blown inwardly via fan 37 from the bottom of the separator 14 through a wind box 38 and flow upwardly through the separator 14, drying the sludge with the hot turbulent gases. The combustion gases contacting the sludge in the separator 14 are at a temperature of from 850° F. to 2,500° F. To achieve the full advantages of the present invention, the sludge contacting hot air and combustion gases are at a temperature of about 1400° F. to about 2,000° F. As shown in FIG. 2, the separator unit 14 will dry, classify and convey sludge in one continuous operation. The sludge or other fluidizable solids containing material enters the separator 14 through a sludge distributor section 40, connecting the hopper 35 to the auger section 34 of the mixer 12, to convey the sludge material into the separator 14 at a rate automatically controlled by differential pressure sensed within the separator 14.

The larger particulate material falls downwardly through the separator 14 at a rate controlled by a residence time controlling device designated generally by reference numeral 42. The residence time controlling device 42 includes a first frustoconical surface 44 angled downwardly to direct the sludge material to a central position 46 along a longitudinal axis of the separator 14. The sludge material, at least partially dryed, falls through a central aperture 48 onto a rotating umbrella device 50 having a plurality of downwardly inclined, radially extending arms 52 extending close to (i.e. 2-6 inches from) an interior wall 54 of the separator 14. The umbrella 50 is generally frustoconical in shape but is directed downwardly from a central shaft 56 toward the bottom of the separator 14 to receive the sludge and to redirect it outwardly toward the interior wall 54 of the separator 14. The arms 52 of the frustoconical umbrella 50 are hingedly secured at their upper ends to a rotatable, annular tube 58 surrounding the central shaft 56. Each umbrella arm 52 is threadedly connected to the rotatable annular tube 58 through a linkage 60 and a threaded collar 62. A gear linkage 64 is disposed against the rotatable annular tube 58 and the gear linkage 64 is connected to an elongated handle 66 so that rotation of the handle 66 rotates the annular tube 58 thereby raising or lowering the collar 62 to change the angle of the umbrella arms 52, as indicated by the arrows in FIG. 2. An upper surface of each umbrella arm 52 includes a plurality of ridges 68 to decrease the rate of movement of the sludge, at least partially dried, along the upper surface of the umbrella arms 52.

Eventually, the dried sludge in particulate form tumbles off of the peripheral edges 70 of the umbrella arms 52 and collects at the bottom of the separator 14, flowing outwardly through a decontaminated, dried sludge outlet 72. From the outlet 72, any particulate matter that contains an excessive toxic chemical, i.e. PCB concentration, may be returned to the mixer 12 for recycling. The mixer 12 mixes the dried coarse particulate matter with the incoming wet sludge and feeds the mixture to the separator 14. The adequately treated sludge can be returned to its source or used in any manner that an uncontaminated soil might be used.

In a lower portion of the separator 14, the partially dry particulate matter is fluidized to form a fluidized bed for efficient vaporization of toxic chemical contaminants. The finer particulates are propelled upwardly through the spinning product separator generally designated by reference numeral 74. The particle separator 74 includes spinning blades 76 rotated in an upper portion of the separator 14 by a motor 72. The fine particulate matter, entrained in the gas flow out of the separator 14, is propelled upwardly out of the separator 14 through conduit 80 (FIG. 1) into cyclone separator 16, and the larger particles (i.e. plus 200 mesh) are returned to the lower or hot gas-contacting fluidized bed portion of the separator 14.

The cyclone separator 16 separates the fine particulates from the gas and the gas exits from the cyclone separator 16 through conduit 82 to the first vapor condensing stage 18. Remaining vapor proceeds to succeeding vapor condensing stages 20 and 22 through conduits 84 and 86, respectively, and into the non-condensed vapor storage vessel 24, while the condensed vapor (essentially toxic chemicals and water) are pumped by pumps 88 and 90 through the two liquid filter sections 26 and 28 to aqueous waste storage vessel 32. The non-condensed vapors from storage vessel 24 are conveyed via conduit 88 to the activated carbon filter 30 and the filtered gas can be vented to the atmosphere through conduit 90. Conduit 90 can be connected through a valved conduit (not shown) to the condensing stages 18,20, or 22 for recycle if found to contain a prohibitive quantity of separated contaminants, such as toxic chemicals. The solid material (soil particulates) exiting the cyclone unit 16 will fall into a welded steel collector 92 for analysis and are collected in a steel drum 94 with a locking top, for shipment by an E.P.A. approved hauler to an E.P.A. approved disposal site. Alternatively, if found to contain legal amounts of contaminants, the cyclone solids may be returned to their source.

All vapor leaving the separator unit 14 will exit through conduit 80, travel through the cyclone 16 and be discharged via conduit 82 into the vapor condensing stages 18, 20 and 22. These units are welded steel cyclones with evaporator coils mounted in each cyclone. The cooling system is supplied by a 72,000 BTU (6 ton) 2 stage air cooled condenser 96 cooled via conduits 98 and 100. The refrigeration lines are be copper tubing. The vapor entering this section will pass over the coils and be condensed back to a liquid state. The liquid or aqueous waste will exit the cyclone condenser stages 18, 20 and 22 into the filter stages 26 and 28 for additional processing.

The present device is highly effective in separating hydrocarbonaceous contaminants, and particularly PCB's and other polyhalogenated toxic chemicals from in the separator 14 such that one percent or less of the toxic chemicals, and generally less than about 0.3 to 1.0 ppm of the contaminants, suhh as PCBs, remain in the dried sludge exiting the separator through conduit 72. The solids entrained into the gas from the separator 14 and removed from the cyclone separator 16 will contain less than about 3 or 4 ppm liquid contaminants.

The residence time of the fluidizable solids within the separator 14 may be controlled by adjusting the angle of the umbrella 52 to control the rate of exhaust of the large particulate matter from the separator 14. The residence time of the fluidizable solids within the separator 14 generally on the order of about 1 minute to about 1.5 hours generally about 5 to 10 minutes.

As shown in FIG. 3, the separator is a Williams Crusher and Pulverizer Company Roller Mill Model No. GNOME designated by reference numeral 14A and described in U.S. Pat. No. 4,245,570.

The separator 14A can replace separator 14 in FIG. 1. The entering fluidizable solid material from mixer 12 falls through a downwardly angled inlet chute 110 and into a crushing area defined between a plurality of rotating crushing elements or grinding rollers 112 and an annular, angled grinding roller ring 114. The grinding roller ring or bull ring 114 surrounds the grinding rollers 112 to define an upper level of a hot gas-sludge contacting area of the separator 14A. The entering sludge is initially fed to the crushing area between the grinding rollers and the surrounding grinding ring 114 where the rollers 112 crush the sludge against the ring 114 to a smaller size to provide more efficient vaporization of the contaminants, such as toxic organic chemicals, contained in and on the fluidizable solids containing sludge.

The ground sludge is dried in the grinding area by contact with hot gas at about 850° to 2500° F. entering the separator 14A through a hot gas receiving bustle 116, including a series of downwardly and inwardly angled peripheral hot gas ports 118 surrounding a lower portion of the separator 14A for fluid communication of the bustle 116 and the lower portion of the separator 14A. The hot gas includes heated air and combustion gases from burner or furnace 36, as described with reference to FIG. 1, and is introduced into the separator 14A at a controlled velocity, i.e. 1500-2000 CFM at, for example, 1400° F. An example of a suitable burner or furnace 36 is a natural gas and air mix fan (37) assisted burner having a capacity of 1,500,000 BTU/hr. The fluidizable solids containing sludge is at least partially dried and a majority of the contaminants are vaporized from the fluidizable solids in and below the grinding area. The larger (i.e. plus 200 mesh), partly dried fluidizable solids particles fall downwardly to a particle fluidized bed area defined between an uppermost level of the grinding area and the bottom closure wall 120 of the separator 14A. In the coarse particle fluidized bed area, the falling coarser fluidizable solid particles are at least partly fluidized and agitated by the combined action of the incoming hot gases entering tangentially from the peripheral ports 118 and a rotating plow 122, including a plurality of radial plow blades 124. The plow blades 124 and grinding rollers 112 rotate continuously via drive shaft 125 to provide efficient hot-gas fluidizable solid particle contact so that the dried, decontaminated fluidizable solid exiting the bottom of the separator through outlet 72A contains less than about 5 PPM and generally less than about 1 PPM. The rate of rotation of the plow blades 124 controls the residence time of the fluidizable solid within the separator 14A and the rate of removal of the decontaminated sludge from the discharge outlet 72A.

The hot gases from the furnace flow upwardly within the separator 14A against the fall of coarser sludge particles, through and around the grinding area and carry finer sludge particles above the grinding area into a finer particle dilute phase fluidized bed area defined between the uppermost level of the grinding area and the particle separator 74, shown in FIG. 2. The product separator 74 is not shown in FIG. 3 since it is the same as shown in FIG. 2. The hot gases and finer, fluidized solid particles in the finer particle secondary or dilute phase fluidized bed area are cooled as a result of the entering fluidizable solids to a temperature of about 200°-550° F., for example 320° F. The upwardly directed finer fluidized particles contact the spinner separator 74, described with reference to FIG. 2, to force most of the contacted particles downwardly for further hot gas contact and vaporization of contaminants so that most of the particles are decontaminated and recovered from the discharge outlet 72A at the bottom of the separator 14A.

The particle separator 74 provides a micrometer adjustment of size of the fineness passing through the spinner blades 76 to the cyclone separator 16 through conduit 80 (FIG. 1). The size of particles conveyed to the cyclone separator 16 is precisely controlled by adjusting the rotating speed and the number of blades 76 of the spinner 74. This turning action of the spinner blades 76 controls the air vortex at the particle separator 74 and controls the size of rejected oversize particles away from the hot gas stream and back down into the classifying, crushing area of separator 14A.

The cyclone separator 16 removes substantially all of the finer particles (99.99%) conveyed thereto by the frustoconical collector 92 and collection drum 94 so that the combustion gases, air, water vapor and vaporized contaminats are conveyed to the aqueous filter condenser stages 18, 20, and 22.

The condenser stages 18, 20 and 22 condense and collect substnatially all of the water vapor, PCB, contaminants, entrained solids from the entering gas stream. The condensable vapor is cooled, for example, from 320° F. to 85° F., and thereby condensed and removed from the bottom of the condenser stages 18, 20 and 22. All solids and contaminants will be wet via the condensing action to fall through the condensed water to the bottom of the condenser, if their density is greater than water. Therefore, in accordance with an important embodiment of the present invention, the liquid filter stages 26 and 28 may be eliminated since all contaminants and entrained solids will be collected in the liquid storage vessel 32 for convenient removal i.e. by decanting the water.

The aqueous filter stages 26 and 28 consist of 2 AMF cuno "zeta plus" filter units model PTI BH 45118-03. These units have a flow capacity of 75 GPM each. The housing is 304 S.S. rated at 100 psig at 200° F. with the filter media totally enclosed and sealed within the unit. The pumps 88 and 90 are driven by 5 HP 220/440/3 1800 rpm electric motors. The filter media is designed to provide filtration without the use of asbestos fibers. Zeta plus filter media possesses a positive charge and exhibits a positive zeta potential in a solution. The charged media matrix electrokinetically absorbs negatively charged contaminants, such as PCB material or other negatively charged contaminants as well as mechanically straining the aqueous waste. This process conitinues until the filter pores are plugged. Selection of the U series media grade will ensure that filter pore plugging occurs before all charge sites become neutralized. The filter stages 26 and 28 will be in duplex configuration so as to allow the changing of one filter 26 while the other 28 is in operation, and vice versa. The used filters will be disposed of in a steel drum with locking top. These units can shipped by licensed hauler to an approved disposal site or can be treated, as in the case of a nontoxic material, for recovery and re use of the contaminant.

A second filter 26A and 28A in each filter stage 26 and 28 is activated carbon filter material contained in a stell housing rated at 100 psig at 200 ° F. The aqueous waste will pass from the stage one section 26 to the duplex filters in the second stage 28. These units will be operated one at a time so as to be able to change filters without interrupting operation. The aqueous waste collected in storage vessel 32 will then be pumped via conduit 102 and pump 104 or 106 into a steel A.S.M.E. storage tank (not shown) for transfer to an EPA approved hauler for delivery to an EPA approved disposal site, or treated for recovery of the contaminant. Alternatively, the aqueous waste can be decanted from an upper portion of the liquid level of storage tank 32 back to the source. The storage tank 32 is vented via conduit 108 through an air activated carbon filter (not shown).

EXAMPLE

PCB laden sludge was removed from the North Branch of the Chicago River at the Chicago Tribune site in Chicago, Ill. Sampling of the removed bottom sediment showed that the sediment contained a minimum of 0.013 ppm PCBs (dry solid basis), a maximum of 164 ppm PCBs (dry solid basis), with an average of 38 ppm PCBs (dry solid basis). The bottom sediment contained a minimum of 13% water by weight, a maximum of 75% water and an average of 53% water by weight.

Based on the above mentioned analysis the composition of the sludge will vary, and worse case-best case situation based on total PCB leads to the following sludge composition:

|  | Low PCB | Average PCB | High PCB |
|---|---|---|---|
| solids, wt. % | 25.0 | 47.0 | 87.0 |
| water, wt. % | 75.0 | 53.0 | 13.0 |
| Total % | 100.0 | 100.00 | 100.00 |
| PCB (dry basis) ppm | 0.013 | 38 | 164 |
| PCB (wet basis) ppm | $3.25 \times 10^{-3}$ | 18 | 143 |

This worse case-best case situation is more stringent than was actually found in the bottom sediment, since the analysis showed the lowest level of PCB with those samples containing the least amount of water. Of the twenty samples analyzed, fourteen were found to contain close to average amounts of water (53%) and PCB (38 ppm). Therefore the PCB removal process and apparatus will treat sludge of average composition at any given instant.

The PCB removal process and apparatus of the present invention will treat, for example, 1000 lbms/hr. of bottom sediment (sludge) varying in amounts of water content from 75 wt. % to 13 wt. % (average: 53 wt. %) and PCB from 0.013 ppm to 164 ppm (average 38 ppm, dry basis) with 2144 lbms/hr. of 1400° F. combustion gas and yield two solid streams, one at 264 lbms/hr. containing 0.28 ppm (dry basis) PCB, another at 206 lbms/hr. containing 1.3 to 2.3 ppm (average 1.8 ppm, dry basis), a liquid stream at 663 lbms/hr. containing $2.56 \times 10^{-3}$ ppm (wet basis) PCB and $3 \times 10^{-7}$ wt. % solids (both virtually nondetectible), and an effluent wet non-condensable gas stream at 2011 lbm/hr. containing nondetectible amounts of entrained solids and PCB. This process is briefly summarized in Table I with Detailed heat and material balances shown in Table II.

TABLE I

| SLUDGE FEED 70° F. | |
|---|---|
| SOLIDS, | 470 lbms/hr. |
| WATER, | 530 lbms/hr. |
| TOTAL: | 1000 lbms/hr. |
| PCB: | 38 ppm (dry basis) |
|  | 18 ppm (wet basis) |
| COMBUSTION GAS 1400° F. | |
| 2144 lbms/hr. | |
| SEPARATOR EFFLUENT SOLIDS 320° F. | |
| 264 lbms/hr. | |
| PCB: 0.28 ppm | |
| CYCLONE EFFLUENT SOLIDS 320° F. | |
| 206 lbms./hr. | |
| 1.3 ppm PCB 2.3 ppm | |
| FILTER EFFLUENT LIQUID 85° F. | |
| Water, 663 lbms/hr. | |
| PCB $2.56 \times 10^{-3}$ ppm (Wet Basis) | Virtually |
| Solids, $2 \times 10^6$ lbms/hr. | Nondectible |

TABLE I-continued

LIQUID CONDENSER 85° F.

Non-condensible gas 1959 lbms/1 hr.
Water vapor, 52 lbms/hr.
TOTAL, 2011 lbms/hr.
Nondectible amounts of
PCB and Solids

TABLE II

SLUDGE FEED, 70° F.

|  | Low PCB Case | Average Case | High PCB Case |
|---|---|---|---|
| Solids, lbms/hr. | 250 | 470 | 870 |
| PCB, lbms/hr. | $3.25 \times 10^{-6}$ | 0.0179 | 0.143 |
| Water, lbms/hr. | 750 | 530 | 130 |
| Total, lbms/hr. | 1000 | 1000 | 1000 |
| PCB Conc. (Dry Basis) ppm | 0.013 | 38 | 164 |
| PCB Conc. (Wet Basis), ppm | $3.25 \times 10^{-3}$ | 18 | 143 |

COMBUSTION GAS, 1400° F.

|  | Low Case | Average Case | High PCB Case |
|---|---|---|---|
| Combustion gas, lbms/hr. | 2932.0 | 2143.9 | 711.1 |
| CFM | 2356.5 | 1723.1 | 571.5 |
| SCFM (70° F.) | 671.1 | 490.7 | 162.8 |

| COMPONENT | Volume % |
|---|---|
| $A_r$ | 0.9 |
| $N_2$ | 72.8 |
| $CO_2$ | 7.3 |
| $O_2$ | 5.6 |
| $H_2O$ | 13.4 |
|  | 100.00 |

SEPARATOR EFFLUENT GAS, 320° F.

|  | Low PCB Case | Average Case | High PCB Case |
|---|---|---|---|
| Effluent Gas, lbms/hr. | 3682.0 | 2673.9 | 841.1 |
| Effluent PCB, lbms/hr. | — | 0.0174 | 0.142 |
| Entrained Solids, lbms/hr. | 109.50 | 205.86 | 381.06 |
| Entrained PCB, lbms/hr. | $1.42 \times 10^{-6}$ | $3.71 \times 10^{-4}$ | $6.86 \times 10^{-4}$ |
| Solids Loading., lbms/ft.$^3$ | $1.32 \times 10^{-3}$ | $3.43 \times 10^{-3}$ | $2.06 \times 10^{-2}$ |
| Effluent gas, CFM | 1382.1 | 1001.5 | 308.1 |
| Effluent Gas, SCFM | 939.8 | 680.4 | 209.2 |
| Effluent PCB, lbms/ft.$^3$ | — | $2.90 \times 10^{-7}$ | $7.67 \times 10^{-6}$ |

| Effluent Gas Component | Low PCB Case | Average Case | High PCB Case |
|---|---|---|---|
| $A_r$, Volume % | 0.6 | 0.6 | 0.7 |
| $N_2$, Volume % | 52.0 | 52.5 | 56.6 |
| $CO_2$, Volume % | 5.2 | 5.3 | 5.7 |
| $O_2$, Volume % | 4.0 | 4.0 | 4.3 |
| $H_2O$, Volume % | 38.2 | 37.6 | 32.7 |
|  | 100.0 | 100.0 | 100.0 |

SEPARATOR EFFLUENT SOLIDS, 320° F.

|  | Low Case | Average Case | High PCB Case |
|---|---|---|---|
| Solids, lbms/hr. | 140.5 | 264.14 | 488.94 |
| PCB, lbms/hr. | $1.83 \times 10^{-6}$ | $7.40 \times 10^{-4}$ | $1.37 \times 10^{-4}$ |
| PCB con., ppm | 0.013 | 0.28 | 0.28 |

CYCLONE EFFLUENT SOLIDS, 320° F.

|  | Low Case | Average Case | High PCB Case |
|---|---|---|---|
| Solids, lbms/hr. | 109.49 | 205.84 | 380.02 |
| PCB, lbms/hr. | $1.97 \times 10^{-4}$ | $3.71 \times 10^{-4}$ | $6.84 \times 10^{-4}$ |
| PCB con., ppm (ave) | 1.8 | 1.8 | 1.8 |

CYCLONE EFFLUENT GAS, 320° F.

|  | Low Case | Average Case | High PCB Case |
|---|---|---|---|
| Effluent Gas, lbms/hr. | 3682.0 | 2673.9 | 841.1 |
| Effluent PCB, lbms/hr. | — | 0.0174 | 0.142 |
| Entrained Solids, lbms/hr. | 0.01 | 0.02 | 0.04 |
| Entrained PCB, lbms/hr. | $1.8 \times 10^{-8}$ | $3.6 \times 10^{-8}$ | $7.2 \times 10^{-8}$ |
| Solids Loading, lbms/ft.$^3$ | $1.21 \times 10^{-7}$ | $3.33 \times 10^{-7}$ | $2.16 \times 10^{-6}$ |
| Effluent gas, CFM | 1382.1 | 1001.5 | 308.1 |
| Effluent Gas, SCFM | 939.8 | 680.4 | 209.2 |
| Effluent PCB, lbms/ft.$^3$ | — | $2.90 \times 10^{-7}$ | $7.68 \times 10^{-6}$ |

CONDENSER EFFLUENT GAS, 85° F.

|  | Low Case | Average Case | High PCB Case |
|---|---|---|---|
| Effluent Gas, lbms/hr. | 2749.7 | 2010.6 | 666.9 |
| Effluent PCB, lbms/hr. | NONDETECTABLE | | |
| Entrained Solids, lbms/hr. | NONDETECTABLE | | |
| Entrained PCB, lbms/hr. | NONDETECTABLE | | |
| Solids Loading, lbms/ft.$^3$ | NONDETECTABLE | | |
| Effluent gas, CFM | 622.6 | 455.3 | 151.0 |
| Effluent Gas, SCFM | 606.2 | 443.3 | 147.0 |

| COMPONENT | Volume % |
|---|---|
| $A_r$ | 1.0 |
| $N_2$ | 80.6 |
| $CO_2$ | 8.0 |
| $O_2$ | 6.2 |
| $H_2O$ | 4.2 |
|  | 100.0 |

CONDENSER LIQUID EFFLUENT, 85° F.

|  | Low Case | Average Case | High PCB Case |
|---|---|---|---|
| Water, lbms/hr. | 932.3 | 663.3 | 174.2 |
| Entrained Solids, lbms/hr. | 0.01 | 0.02 | 0.04 |
| Entrained PCB, lbms/hr. | $1.8 \times 10^{-8}$ | $3.6 \times 10^{-8}$ | $7.2 \times 10^{-8}$ |
| Effluent PCB, lbms/hr. | — | 0.0174 | 0.142 |
| Total, lbms/hr. | 932.31 | 663.34 | 174.38 |

FILTER LIQUID EFFLUENT, 85° F.

|  | Low Case | Average Case | High PCB Case |
|---|---|---|---|
| Water, lbms/hr. | 932.3 | 663.3 | 174.2 |
| Entrained Solids, lbms/hr. | $1 \times 10^6$ | $2 \times 10^{-6}$ | $4 \times 10^{-6}$ |
| Entrained PCB, lbms/hr. | $1.8 \times 10^{-12}$ | $3.6 \times 10^{-12}$ | $7.2 \times 10^{-12}$ |
| Effluent PCB, lbms/hr. | — | $1.7 \times 10^{-6}$ | $1.4 \times 10^{-5}$ |
| Total, lbms/hr. | 932.3 | 663.3 | 174.2 |
| Total PCB CON. (Wet basis), PPM | $1.90 \times 10^{-9}$ | $2.56 \times 10^{-3}$ | $8.04 \times 10^{-2}$ |
| PCB CONC. on solids, ppm | | 1.3 PCB 2.3 ppm | |

MATERIALS COLLECTED BY FILTER CARTRIDGES

|  | Low | Average | High PCB |
|---|---|---|---|

TABLE II-continued

|  | Case | Case | Case |
|---|---|---|---|
| Entrained Solids, lbms/hr. | 0.01 | 0.02 | 0.04 |
| Entrained PCB, lbms/hr. | $1.8 \times 10^{-8}$ | $3.6 \times 10^{-8}$ | $7.2 \times 10^{-8}$ |
| Effluent PCB, lbms/hr. | — | 0.0174 | 0.142 |
| Total, lbms/hr. | 0.01 | 0.0374 | 0.182 |

Turning now to FIG. 4, there is illustrated another embodiment of apparatus for removing a hydrocarbonaceous contaminant or contaminant mixtures, such as toxic chemicals from fluidizable solids, such as sludge, generally designated by reference numeral 10A. Fluidizable solids contaminated with a hydrocarbonaceous contaminant, such as PCBs or other toxic chemicals, is directed into the apparatus 10A through the mixer, generally designated by reference numeral 12A. The mixer 12A is a conventional mixer/feeder having a screw or auger feeding mechanism 34 such as that described with reference to FIG. 1. The mixer 12A includes a hopper 35A of suitable size to hold a relatively large quantity of fluidizable solids, such as sludge, above the auger or feeding mechanism disposed in a lower portion of the hopper 35A. If desired, additional material such as clean water or chemicals can be added to the sludge in the mixer/feeder 12A to provide a sludge having a predetermined percentage, e.g. 50% by weight, of water or to dissinfect or otherwise treat the sludge in the mixer/feeder 12A. If the sludge fed to the hopper 35A contains excess liquid, the excess liquid, i.e. water, may be removed, such as by draining the liquid from a lower outlet conduit 37 in the hopper 35A, or by filtering the contaminated fluidizable material to a desired liquid content, e.g. 30–70% liquid, prior to feeding the material to the hopper 35A. In some cases, contaminated solids having an undesirably high liquid content can be directed to a holding tank (not shown) where the solids can settle to the bottom and excess liquid can be removed from the top of the tank. The settled solids can then be pumped, such as by a screw or auger feed mechanism directly into the hopper 12 or 12A. The removed, excess liquid can by-pass the separator and be directed to the dilute toxic chemical storage vessel 170, or may be directed to the process water storage vessel 174, if sufficiently clean.

The sludge from the mixer/feeder 12A is fed by the feeder mechanism or auger through sludge distributor section 40A of the mixer/feeder 12A into a lower portion of a toxic chemical separator 14B. The toxic chemical separator 14B may be the device 14 or 14A described with reference to FIGS. 1-3. The separator operates at a pressure slightly below atmospheric, e.g. 3–5 inches of water below ambient. A burner or furnace 36A is connected to a lower portion of the separator 14B to blow hot air and combustion gases (850° to 2500° F.) into the separator 14B through conduit 39 and wind box 38A, described with reference to FIG. 1. The hot air and combustion gases flow upwardly through the separator 14B, drying the sludge with the hot turbulent gases. The combustion gases contacting the sludge in the separator 14B are at a temperature of from about 850° F. to about 2500° F. To achieve the full advantages of the present invention, the sludge-contacting hot gases, e.g. hot air and combustion gases are at a temperature of about 1000° F. to about 1,800° F. The burner or furnace 36A may be supplemented with chemical injection, steam injection, or hot recycle gas such as air diverted from another stage in the process in addition to the hot air and combustion gases fed to the burner 36A, as described with reference to FIGS. 1-3.

The toxic chemicals are vaporized and separated from the sludge in the sludge separator 14B, as described with reference to FIGS. 1-3, and the detoxified solid, dried sludge exits the separator 14B through conduit 72B, having a toxic chemical content generally less than about 5 parts per million and usually in the range of about 3–4 parts per million. Any particulate matter from the decontaminated, dried sludge outlet 72A containing an excessive toxic chemical concentration, e.g. PCB, may be returned to the mixer 12A for recycling. The mixer 12A mixes the dried coarse particulate matter with the incoming wet sludge and feeds the material to the separator 14B. The adequately treated dried sludge exiting the separator 14B can be returned to its source or used in any manner that an uncontaminated solid material, such as soil, might be used.

As described with reference to FIGS. 1-3, the partially dry particulate sludge material is fluidized in a lower portion of the separator 14B to form a fluidized bed for efficient vaporization of toxic chemical contaminants. The finer particulates are propelled upwardly through the spinning product separator, described with reference to FIGS. 2 and 3, where a coarser portion of the particulate matter is propelled downwardly to a lower hot gas-contacting fluidized bed portion of the separator 14B. A finer portion of the particulates are propelled upwardly out of the separator 14B through conduit 80A into cyclone separator 16A. The cyclone separator 16A separates the fine particulates from the gas and the gas exits from the cyclone separator 16A through conduit 82A to an upper portion of a scrubber 130. A portion of the gas may be recirculated to the wind box 38A of the separator 14B through conduit 129 (see Table IV). Virtually all of the fine particulates entrained in the gas leaving the separator 14B are propelled downwardly in the cyclone separator 16A and exit from a fine particulate exit conduit 126 at the bottom of the cyclone separator 16A as a clean, dry stream. The clean particulates from the cyclone separator in conduit 126 can be combined along conduit 127 with the detoxified solids exiting the separator 14B and collected in a suitable container 129 for testing, or the solids, if clean, can be returned to the original location or used in some other manner in which decontaminated solids, i.e soil, are useful.

The vapors from the cyclone separator 16A flow through conduit 82A to a venturi scrubber 130. The scrubber 130 initially cools the gas exiting the top of the cyclone separator 16A along conduit 82A and removes some of the contaminants therefrom. The hot gases from conduit 82A enter the scrubber 130 through a centrally disposed venturi section 132 cocurrently with a flow of water through the venturi section 132 entering the scrubber 130 from conduit 134. A suitable level detector 136 disposed near the base of the scrubber 130 is operatively connected to valve 138 in conduit 134 to control the removal of condensate formed in the scrubber 130. The condensate from scrubber 130 passes through conduit 139 and pump 140, and a portion of the condensate is recirculated to the top of the scrubber 130 through conduit 146. A portion of the condensate flows through conduit 134 to the dilute toxic chemical storage vessel 170 for further treatment.

A portion of the contaminants contained in the gas entering the scrubber 130 are condensed within the scrubber 130 and mixed with scrubbing water exiting the scrubber at the bottom of the scrubber through conduit 139. If desired, acidic or basic chemicals may be added to the dilute toxic chemicals exiting the separator 130 via pump 140 through conduit 139 from chemical storage 142 and conduit 144 to provide scrubbing water having a desired pH. The dilute toxic chemicals and cooling water from the bottom of the scrubber 130 are recycled through conduits 146 and 148 and through a cooler 150 to provide scrubber cooling water having a sufficiently low temperature for condensation of incoming water vapor and toxic chemical vapors. The cooled, recirculated water flows through conduit 152 back to the top of the scrubber.

Vapors from the scrubber 130 exit from upper portion of the scrubber 130 through conduit 156 and are conveyed through conduit 158. A portion of the vapors from conduit 158 may be recycled to the separator 14B, the remainder being conveyed through conduit 159 to a lower portion of another scrubbing column or final gas washer 160. In the final gas washer 160, the gas from the scrubber 130 is further cooled by direct contact with countercurrently flowing cooling water to condense a remaining portion of the toxic chemicals from the gas. The final gas washer 160 includes any suitable gas liquid contact medium therein (not shown) such as trays, packing material or dual-flo decks, and this device should achieve condensation and scrubbing of the remaining toxic chemicals from the gas entering the final gas washer 160. The toxic chemicals condensed and mass transferred to the liquid are removed from the final gas washer 160 at the bottom through conduit 162 and a major portion of the condensed toxic chemicals and water are circulated back to washer 160 through cooler 164 by means of pump 163 for additional condensation of toxic chemicals from the gas.

A suitable level detector 167 disposed near the base of the washer 160 is operatively connected to valve 169 in conduit 166 to control the passage of condensate, formed in the washer 160, through conduit 168 to the dilute toxic chemical storage vessel 170 for further treatment.

The gas exiting an upper surface of the final gas washer 160 along conduit 176 enters a lower portion of a chiller 180. The chiller 180 is not always needed, but is used where necessary to achieve removal of a final portion of the toxic chemicals contained in the gas stream by contact of toxic chemical bearing gas with coils 181 carrying coolant recirculated through conduits 182 and 184 and refrigeration unit 186. An activated carbon filter 193 is disposed in gas conduit 195 at the top of the chiller 180.

A suitable level detector 187 disposed near the base of chiller 180 is operatively connected to valve or pump 191 in chiller exit conduit 188 to control the removal of condensate formed in the chiller 180. The condensate passes through conduits 193 and 168 to the dilute toxic chemical storage vessel 170 for further treatment. The chiller 180 includes a re-heat section having coils 183 which receive effluent water from venturi scrubber 130. A portion of the effluent water from the scrubber 130 passes through conduit 154, through conduit 185, and through coils 183, exiting the chiller 180 through conduit 189 and back to the top of the scrubber 130 through conduits 152 and 134. Reheating of the gas exiting the chiller 180 by the above-described recirculation of the water from scrubber 130 substantially increases the dry-bulb temperature of the gas exiting the chiller 180 to eliminate steam plume problems. The dilute toxic chemical removed from a lower portion of the chiller 180 along conduit 188 joins the dilute toxic chemical from final gas washer 160 in conduit 168 and is conveyed into the dilute toxic chemical storage vessel 170 for further treatment.

Material from the dilute toxic chemical storage vessel 170 is conveyed to filter stages 171 and 173, where the dilute toxic chemical is filtered through an oppositely charged filter medium and then through activated carbon to separate the toxic chemicals from the water. Decontaminated water is conveyed along conduit 172 to clean water storage 174 from which it may be returned to its source through conduit 176, or conveyed to an approved disposal unit or disposal site if found to contain a prohibitive amount of toxic chemical.

Each filtration stage 171 and 173 includes two parallel units 171A, 171B; and 173A and 173B to provide for continuous operation while units are replaced. The dilute toxic chemical from the storage vessel 170 is conveyed through one of the two first stage filters 171A or 171B and then through one of the second stage filters 173A or 173B. The first stage filter may be, for example, diatomaceous earth or an electrically charged filter medium having a charge opposite to the charge of the contaminant liquid being recovered. The second stage filters may be, for example, activated carbon or a combination of sand and anthracil, as known in the filtration art. The first stage filters 171A or 171B, for example, an oppositely charged filter medium, is described with reference to FIGS. 1-3. One example of an electrically charged filter medium is AMF Cuno Zeta Plus elements providing contaminant removal by mechanical straining and electrokinetic adsorption. Alternatively, when the toxic chemical is essentially not soluble in water and will separate from water, for example as a result of density difference, the toxic chemical can be removed from the water directly from the holding tank 170.

TABLE III

| STREAM | | | | | | | PSIG | SGPM | FGPM |
|---|---|---|---|---|---|---|---|---|---|
| No. | NAME | LB/HR. | °F. | BTU/LB | $10^6$ BTU/HR | MWT | (IN WG) | (KSCFM) | (KACFM) |
| 1 | Sludge to Separator 14B | 100,000 | 60 | 0 | 0 | — | — | — | — |
|  | Water (Liquid) | 50,000 | 60 | 0 | 0 | — | — | — | — |
|  | Solids | 50,000 | 60 | 0 | 0 | — | — | — | — |
| 2 | Process Gas to Separator |  |  |  |  |  |  |  |  |
|  | 14B | 115,567 | 2,100 | 691.7 | 79.941 | 28.62 | (−4) | (29.0) | (142.8) |
|  | Dry Gas | 105,605 | 2,100 | 552.0 | 58.294 | 29.62 | (−4) | (25.5) | — |
|  | Water Vapor | 9,962 | 2,100 | 2173.0 | 21.647 | 18.02 | (−4) | (3.5) | — |
| 3 | Solids from Separator 14B | 42,350 | 320 | 78.0 | 3.303 | — | — | — | — |
| 4 | Materials to Cyclone 16A | 173,217 | 320 | 442.4 | 76.638 | 25.42 | (−14) | (46.5) | (69.8) |
|  | Solids | 7,650 | 320 | 78.0 | 0.597 | — | (−14) | — | — |
|  | Dry Gas | 105,605 | 320 | 63.0 | 6.653 | 29.62 | (−14) | (25.5) | — |

TABLE III-continued
ENTHALPY & MATERIAL BALANCE

| STREAM No. | NAME | LB/HR. | °F. | BTU/LB | 10⁶ BTU/HR | MWT | PSIG (IN WG) | SGPM (KSCFM) | FGPM (KACFM) |
|---|---|---|---|---|---|---|---|---|---|
| | Water Vapor | 59,962 | 320 | 1157.2 | 69.388 | 18.02 | (−14) | (21.0) | — |
| 5 | Solids from Cyclone 16A | 7,650 | 320 | 78.0 | 0.597 | — | — | — | — |
| 6 | Process Gas to Scrubber 130 | 165,567 | 320 | 459.3 | 76.041 | 25.42 | (−19/+21) | (46.5) | (69.8) |
| | Dry Gas | 105,605 | 320 | 63.0 | 6.653 | 29.62 | (−19/+21) | (25.5) | — |
| | Water Vapor | 59,962 | 320 | 1157.2 | 69.388 | 18.02 | (−19/+21) | (21.0) | — |
| 7 | Process Gas to Washer 160 | 144,848 | 166 | 318.0 | 46.057 | 26.48 | (0/+40) | (39.3) | (47.3) |
| | Dry Gas | 105,605 | 166 | 25.6 | 2.709 | 29.62 | (0/+40) | (25.5) | — |
| | Water Vapor | 39,243 | 166 | 1104.6 | 43.348 | 18.02 | (0/+40) | (13.8) | — |
| 8 | Water from Scrubber 130 | 537,683 | 166 | 105.9 | 55.781 | — | 0/+50 | 1075 | 1101 |
| 9 (1) | To Reheat | 27,046 | 166 | 105.9 | 2.837 | — | 0/+50 | 54 | 55 |
| 10 (1) | From Reheat | 27,046 | 100 | 39.9 | 1.079 | — | 35 | 54 | 54 |
| (1) | Reheat Duty | — | — | — | 1.758 | — | — | — | — |
| 11 (1) | Total Water to Scr. Cooler 150 | 537,683 | 166 | 105.9 | 55.781 | — | 50 | 1075 | 1101 |
| 12 (1) | Total Water From Scr. Cooler | 537,683 | 110 | 49.9 | 26.831 | — | 35 | 1075 | 1084 |
| (1) | Cooler Duty | — | — | — | 28.950 | — | — | — | — |
| 13 | Water to Scrubber 130 | 516,964 | 110 | 49.9 | 25.797 | — | NOM | 1034 | 1043 |
| 14 (1) | Scrubber Condensate to Storage 170 | 20,719 | 110 | 49.9 | 1.034 | — | 20 | 41 | 41 |
| 15 (1) | Total Scrubber Eff. To Storage 170 | 20,719 | 110 | 49.9 | 1.034 | — | 20 | 41 | 41 |
| 16 | Clean Gas from Washer 160 | 112,957 | 115 | 83.0 | 9.371 | 28.86 | (+14) | (28.1) | (31.1) |
| | Dry Gas | 105,605 | 115 | 13.3 | 1.406 | 29.62 | (+14) | (25.5) | — |
| | Water Vapor | 7,352 | 115 | 1083.4 | 7.965 | 18.02 | (+14) | (2.6) | — |
| 17 | Water From Washer 160 | 688,135 | 161 | 100.9 | 69.433 | — | 0/+50 | 1376 | 1410 |
| 18 | Water From Wash Cooler 164 | 688,135 | 110 | 49.9 | 34.338 | — | 35 | 1376 | 1387 |
| 18A | To Washer | 656,244 | 110 | 49.9 | 32.747 | — | 15 | 1312 | 1323 |
| | Cooler Duty | — | — | — | 35.095 | — | — | — | — |
| 19 | Washer Condensate to Storage 170 | 31,891 | 110 | 49.9 | 1.591 | — | 20 | 68 | 69 |
| 20 | Chiller Cond. to Storage 170 | 4,562 | 77 | 17.0 | 0.077 | — | 0/20 | 9 | 9 |
| 21. | Clean Gas From Chiller 180 | 108,395 | 85 | 33.4 | 3.623 | 29.32 | (+14) | (26.5) | (27.8) |
| | Dry Gas | 105,605 | 85 | 6.0 | 0.636 | 29.62 | (+14) | (25.5) | — |
| | Water Vapor | 2,790 | 85 | 1070.5 | 2.987 | 18.02 | (+14) | (1.0) | — |
| | Chiller Duty | — | — | — | 5.671 | — | — | — | — |
| 23 (1) | Clean Gas From Reheat Coils 183 | 108,395 | 151 | 49.6 | 5.381 | 29.32 | (+10) | (26.5) | (31.1) |
| | Dry Gas | 105,605 | 151 | 21.9 | 2.316 | 29.62 | (+10) | (25.5) | — |
| | Water Vapor | 2,790 | 151 | 1098.4 | 3.065 | 18.02 | (+10) | (1.0) | — |
| 24 | Clean Solids to Disposal | 50,000 | 320 | 78.0 | 3.900 | — | — | — | — |
| 25 | Total Condensate to Storage | 57,172 | 107 | 47.0 | 2.702 | — | — | 114 | 115 |

TABLE IV
ENTHALPY & MATERIAL BALANCE FOR RECYCLE FROM CYCLONE TO GAS PREP. FOR 1400° F. TO EXTRACTOR

| STREAM NAME | LB/HR. | °F. | BTU/LB | 10⁶ BTU/HR | MWT | PSIG (IN WG) | SGPM (KSCFM) | FGPM (KACFM) | NO. |
|---|---|---|---|---|---|---|---|---|---|
| Gas from Burner 36A | 115,567 | 2100 | 691.7 | 79.941 | 28.62 | (−2) | (29.0) | (142.8) | 102 |
| Dry Gas | 105,605 | — | 552.0 | 58.294 | 29.62 | — | (25.5) | — | — |
| Water Vapor | 9,962 | — | 2173.0 | 21.647 | 18.02 | — | (3.5) | — | — |
| Recycle from Cyclone 16A | 72,674 | 320 | 459.3 | 33.379 | 25.42 | (−2) | (19.1) | (28.6) | 106A |
| Dry Gas | 46,354 | — | 63.0 | 2.920 | 29.62 | — | (9.9) | — | — |
| Water Vapor | 26,320 | — | 1157.2 | 30.459 | 18.02 | — | (9.2) | — | — |
| Total Gas to Separator 14B | 188,241 | 1400 | 602.0 | 113.320 | 26.35 | (−4) | (45.1) | (161.3) | 102A |
| Dry Gas | 151,959 | — | 335.0 | 50.907 | 29.62 | — | (32.4) | — | — |
| Water Vapor | 36,282 | — | 1720.2 | 62.413 | 18.02 | — | (12.7) | — | — |
| Sludge to Separator 14B | 100,000 | 60 | 0 | 0 | — | — | — | — | 101 |
| Solids | 50,000 | — | 0 | 0 | — | — | — | — | — |
| Liquid Water | 50,000 | — | 0 | 0 | — | — | — | — | — |
| Solids from Separator 14B | 42,350 | 320 | 78.0 | 3.303 | — | — | — | — | 103 |
| Material to Cyclone 16A | 245,891 | 320 | 447.4 | 110.017 | 25.42 | (−14) | (62.6) | (93.9) | 104 |
| Solids | 7,650 | — | 78.0 | 0.597 | — | — | — | — | — |
| Process Gas | 238,241 | — | 459.3 | 109.420 | 25.42 | — | (62.6) | | |
| Dry Gas | 151,959 | — | 63.0 | 9.573 | 29.62 | — | (32.4) | — | — |
| Water Vapor | 86,282 | — | 1157.2 | 99.847 | 18.02 | — | (30.2) | — | — |
| Solids from Cyclone 16A | 7,650 | 320 | 78.0 | 0.597 | — | — | — | — | 105 |
| Process Gas From Cyclone 16A | 238,241 | 320 | 459.3 | 109.420 | 25.42 | (−19/+21) | (62.6) | (93.9) | 106B |
| Dry Gas | 151,959 | — | 63.0 | 9.573 | 29.62 | — | (32.4) | — | — |
| Water Vapor | 86,282 | — | 1157.2 | 99.847 | 18.02 | — | (30.2) | — | — |
| Process gas to Scrubber | 165,567 | 320 | 459.3 | 76.041 | 25.42 | (+21) | (46.5) | (69.8) | 106 |
| Dry Gas | 105,605 | — | 63.0 | 6.653 | 29.62 | — | (25.5) | — | — |
| Water Vapor | 59,962 | — | 1157.2 | 69.388 | 18.02 | — | (21.0) | — | — |

A material balance for treatment of 100,000 lbs. per hour of sludge containing 50% water through the apparatus of FIG. 4 follows and in tables III and IV for PCB laden material taken from Waukegan harbor in Waukegan, Ill. having 500 ppm PBs, dry basis, on the solid portion.

|  | lb/hr. | | ppm |
| --- | --- | --- | --- |
|  | Total | PCB | PCB |
| Solids to extractor | 50,000 | 25 | 500 |
| Solids from extractor | 42,350 | 0.0127 | 0.3 |
| Solids from cyclone | 7,650 | 0.0153 | 2.0 |
| Combined solids | 50,000 | 0.028 | 0.56 |
| Combined condensate | 57,172 | 24.972 | 436.7 |

|  | lb/hr. |
| --- | --- |
| Filter elements and cakes, net | 250 |
| PCB adsorbed | 24.972 |
| Total to disposal | 275 |
| PCB in effluent water 0.5 PPB | Negligible |

The foregoing detailed description has been given for clearness of understanding only and no unnecessary limitations should be understood therefrom as many modifications will be obvious to those skilled in the art.

What is claimed and sought to be secured by the Letters Patent of the United States is:

1. A method for treating a fluidizable solid material contaminated with a toxic organic contaminant having a boiling point of at least 110° C. comprising:
   fluidizing and heating said fluidizable solid in a drying vessel at a temperature sufficient to enable recovery of substantially all of said toxic organic contaminants in a gaseous stream out of said drying vessel, leaving 5 parts per million or less of the contaminants in the fluidizable solids, thereby separating the contaminant from a major portion of the fluidizable solids; and
   removing said gaseous stream containing said separated contaminants from said drying vessel for further treatment.

2. The method of claim 1 wherein the material is exposed to a hot gas for a period of ½ minute to about 1.5 hours.

3. The method of claim 2, wherein the hot gas vaporizes said contaminants and entrains a portion of the fluidized solids, as fine particulates, into said vaporized contaiminants.

4. The method of claim 3 further including separating the particulates from the contaminants.

5. A method for treating a fluidizable solid contaminated with a polyhalogenated orgainc toxic chemical comprising:
   contacting the fluidizable solids in a separator with hot turbulent gas at a temperature sufficient to enable recovery of substantially all of the toxic organic contaminants in a gaseous stream out of the separator and thereby separate the polyhalogenated organic from the fluidizable solids and gaseously entrain a portion of the finer fluidizable solid sludge in particulate form, leaving a dryed particulate mass of fluidizable solids having about 5 ppm or less of polyhalogenated organics; and
   removing said gaseous stream containing the separated polyhalogenated organics from said separator.

6. The method of claim 5 further including conveying the entrained particulate fluidizable solids out of said separator and separating the particulate sludge from the vaporized polyhalogenated organics.

7. The method of claim 6 wherein the fluidizable solids is contacted with hot turbulent air and combustion gases at a temperature of 1000° F. to 1800° F.

8. The method of claim 6 including directing the fluidizable solids into the separator and onto a first drying surface disposed within said separator, said first surface angled downwardly from a periphery of the separator towards a longitudinal center of the separator for directing the fluidizable solid into a position at the longitudinal center of the separator for contact with the hot turbulent gas and vaporization of the polyhalogenated organics; and
   dropping the fluidizable solids from said first surface onto a lower, second drying surface disposed within said separator, said second surface angled downwardly from the longitudinal center of the separator towards the periphery of the separator for directing the fluidizable solids toward the periphery of the separator, while vaporizing the polyhalogenated organics from the fluidizable solids.

9. The method of claim 8 wherein said first and second drying surfaces ares frusto-conically shaped.

10. A method of removing a toxic chemical having a boiling point of at least 110° C. from a fluidizable solid comprising:
    conveying said fluidizable solid said a hot, turbulent gas at a temperature of about 850°–2500° F., into a vaporization chamber;
    contacting said fluidizable solid with said hot turbulent gas in a hot glas-fluidizable solid first fluidized bed contacting zone in a lower portion of said vaporation chamber to fluidize at least a portion of said fluidizable solids in said lower vaporation chamber, to vaporize a majority of said toxic chemicals from said fluidizable solids in said lower portion thereby forming a gaseous stream containing said toxic chemicals recoverable from said vaporization chamber; and to cool said hot gases;
    conveying said cooled hot gas upwardly through said vaporization chamber at a rate sufficient to propel a finer particulate portion of the fluidizable solids above the first fluidized bed contacting zone to a second fluidized bed contacting zone at a lower temperature than, and disposed above, said first fluidized bed contacting zone, whereby a finer particulate portion of the fluidizable solids is fluidized by said cooled hot gases and additional toxic chemical is vaporized from said fluidized finer particulates in said second fluidized bed contact zone;
    removing said gaseous stream containing said gases and vaporized toxic chemicals from the vaporization chamber for further treatment.

11. The method of claim 10 further including directing a portion of the fluidizable solid particulates from the second fluidized bed down toward the first fluidized bed for further vaporization of toxic chemicals from said downwardly directed particulates.

12. The method of claim 10 wherein the second fluidized bed has a temperature of 250° to 500° F.

13. The method of claim 12 wherein the second fluidized bed has a temperature of 300° to 350° F.

14. The method of claim 10 including separating the soil particulates from the gaseous stream removed from the vaporization chamber.

15. The method of claim 10 including condensing the vaporized toxic chemicals from the gaseous stream removed from the vaporization chamber.

16. The method of claim 10 including condensing a portion of the gaseous stream removed from the vaporization chamber to form a condensate and separating a substantial portion of the condensed toxic chemicals from the remaining condensate.

17. The method of claim 16 wherein the gaseous stream removed from the vaporization chamber are chilled to a temperature below about 200° F. to form said condensate.

18. The method of claim 17 wherein the gaseous stream removed from the vaporization changer are chilled to a temperature below about 100° F. to form said condensate.

19. The method of claim 10 wherein the removed gases and entrained particulates are conveyed through a means for separating solids from gas and the gaseous portion is conveyed to a condenser to condense a major portion of the toixic chemicals from the vapor as a toxic condensate.

20. The method of claim 19 including conveying the toxic condensate through a filter capable of selectively filtering said toxic chemical from the remaining condensate.

21. The method of claim 20 wherein the toxic chemical is a polyhalogenated biphenyl and wherein said filter has a positive charge and thereby electrically adsorbs the polychlorinated biphenyl from the condensate.

22. The method of claim 10 including grinding the fluidizable solids in the vaporization chamber while contacting said fluidizable solids with said hot gas.

23. The method of claim 22 wherein said first fluidized bed is disposed below an area in said vaporization chamber where said soil is ground and including conveying a coarser portion of the ground soil down to said first fluidized bed and agitating the coarser soil in said first fluidized bed to achieve more efficient vaporization of said toxic chemical.

24. The method of claim 10 wherein the vaporization chamber includes a rotating member having radially extending blades disposed in an upper portion of the vaporization chamber whereby a portion of the particulates entrained in the rising gas is mechanically pushed downwardly by said blades for recycling toward said first fluidized bed.

25. The method of claim 16 wherein the fluidizable solids includes at least 10% by weight water and wherein the toxic chemical is substantially water insoluble and including separating the water from the toxic chemical by decanting the water therefrom.

26. The method of claim 10 wherein the fluidizable solids comprises a sludge having 10–90% soil solids and 10–90% liquid, said liquid being predominantly water, and wherein the toxic chemical is selected from the group consisting of polyhalogenated organic compounds, chlordane and dioxin.

27. The method of claim 26 wherein the soil contains at least 20% by weight water so that water vapor formed in the first fluidized bed aids in entraining vaporized toxic chemicals out of the vaporization chamber.

28. The method of claim 10 wherein the toxic chemical comprises a substituted hydrocarbonaeous compound containing at least one unsaturated ring and at least one halogen atom.

29. The method of claim 10 wherein the toxic chemical comprises a substituted hydrocarbonaceous material having a boiling point of about 110° to 650° C.

* * * * *